United States Patent Office 2,801,247
Patented July 30, 1957

2,801,247
ANAESTHETIC COMPOUNDS

Arthur Ernest Wilder Smith and Emil Hofstetter, Wolhusen, Switzerland, assignors to Ed. Geistlich Sohne A. G. für Chemische/Industrie, Wolhusen, Lucerne, Switzerland, a corporation of Switzerland No Drawing. Application December 14, 1954, Serial No. 475,282

Claims priority, application Switzerland December 22, 1953

1 Claim. (Cl. 260—294)

This invention is concerned with improvements in or relating to new anaesthetic compounds, and processes for their preparation.

These new compounds possess a useful pharmacological activity in that they represent particularly valuable local anaesthetics especially for nerve block anaesthesia.

According to the invention there are provided new compounds of anaesthetic activity having the general formula

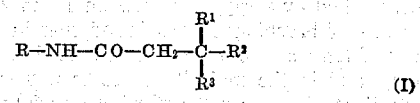

where R is a monochlorophenyl radical or a dichlorophenyl radical which dichlorophenyl radical has at least one chloro-substituent in the meta- or para-position, $R^1$ is hydrogen or an alkyl group having from one to five carbon atoms, $R^2$ is an alkyl group having from one to five carbon atoms and $R^3$ is a dialkylamino group containing from two to four carbon atoms or a piperidyl or monoalkyl piperidyl group and non-toxic (as herein defined) salts thereof.

The term "non-toxic" as applied to the new salts of the present invention is meant to designate such salts the cation of which is substantially non-toxic at effective levels of administration.

The chlorine substituents in the phenyl group are preferably in the ortho- and/or para-positions.

The characteristic feature of the new compounds according to the present invention resides in the halogen substituent or substituents in the phenyl radical. It is already known (see Nature vol. 170, 980 (1952) and Helv. Chem. Acta XXXVI, p. 1698, (1953)) that compounds of the type

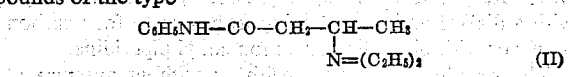

possess protracted local anaesthetic activity.

It has been found that compounds according to the present invention possess important and unexpected advantages when compared with the compounds described in the above mentioned publications, namely:

1. The compounds of this invention give rise to a more protracted anaesthetic effect in both nerve-block and infiltration anaesthesia, and
2. They possess an enhanced surface anaesthetic effect.

The preferred new anaesthetic compounds of general Formula I above are those in which $R^1$ is hydrogen, and $R^2$ is a methyl or ethyl group.

The new anaesthetic compounds may conveniently be converted into their acid salts, with for example hydrochloric acid, sulphuric acid, acetic acid, tartaric acid and citric acid.

Specific preferred new compounds according to the invention are β-diethylamino butyric acid-(p-chloro)-anilide, β-diethylamino butyric acid-(o,p-dichloro)-anilide, β-piperidyl butyric acid-(o-chloro)-anilide, β-piperidyl butyric acid-(m-chloro)-anilide, β-piperidyl butyric acid-(p-chloro)-anilide, β-piperidyl butyric acid-(o,p-dichloro)-anilide, and β-piperidyl butyric acid-(2,5-dichloro)-anilide, and their non-toxic salts.

β-Diethylamino butyric acid-(p-chloro)-anilide hydrochloride melts at 133–137° C. and is easily soluble in water.

β-Diethylamino butyric acid-(o,p-dichloro)-anilide melts at 70–72° C., is recrystallizable from petroleum ether, and with acids forms salts which are easily soluble in water.

β-N-piperidyl butyric acid-(o-chloro)-anilide melts at 84–86° C., is recrystallizable from alcohol and its hydrochloride is easily soluble in water.

β-N-piperidyl butyric acid-(m-chloro)-anilide melts at 115–116° C., and is recrystallizable from acetone. It is easily soluble in dilute acids.

β-N-piperidyl butyric acid-(p-chloro)-anilide melts at 105–107° C., is recrystallizable from alcohol, and its hydrochloride is easily soluble in water.

β-N-piperidyl butyric acid-(o,p-dichloro)-anilide melts at 85–87° C., and is recrystallizable from petroleum ether. With acids it forms salts which are easily soluble in water.

β-N-piperidyl butyric acid-(2,5-dichloro)-anilide melts at 111–112° C. and is recrystallizable from acetone. With acids it forms salts which are easily soluble in water.

We now tabulate below certain of the new compounds according to the invention, giving in each case the results obtained in vivo for their infiltration anaesthetic activity, their surface anaesthetic activity, their acute toxicity (LD$_{50}$) and an indication of the irritation caused to the tissue upon administration.

| No. | Compound of formula I, where R¹ is hydrogen, R² is a methyl group, and— R is— | R³ is— | Infiltration effect | Surface effect | Toxicity: $LD_{50}$ in mg./kg. (mouse) | Tissue irritation |
|---|---|---|---|---|---|---|
| 1 | Cl–C₆H₄– | Et₂N– | +++ | + | 450 sc. | + |
| 2 | Cl–C₆H₄– (with Cl) | H piperidyl N– | ++++ | +++ | 171 sc. / 115 ip. | ++ |
| 3 | C₆H₄– (Cl substituent) | H piperidyl N– | ++++ | + | 238 sc. / 183 ip. | ++ |
| 4 | C₆H₄– (Cl) | H piperidyl N– | ++++ | +++ | 212 sc. | ++ |
| 5 | Cl–C₆H₃–Cl | Et₂N– | ++++ | + | 220 sc. / 175 ip. | 0 |
| 6 | Cl–C₆H₃–Cl | H piperidyl N– | ++++ | +++ | 312 sc. / 150 ip. / 59 iv. | (+) |
| 7 | C₆H₃(Cl)(Cl) | H piperidyl N– | ++++ | +++ | 158 sc. | ++ |
| X | C₆H₅– | Et₂N– | ++ | + | 500 sc. / 90 iv. | 0 |

Compound X is the known compound of Formula II, the results for which are given for purposes of comparison only.

In the results given above for the infiltration effect and surface effect + means weaker than, ++ means equal to, +++ means stronger than and ++++ means 5–10 times stronger than the standard, which in the case of the infiltration effect was procaine, and for the surface effect was cocaine.

The tests for infiltration anaesthesia were in each case carried out upon the back of guinea pigs according to the method of Bülbring. The tests to determine surface anaesthetic effect were carried out upon the corneas of the eyes of guinea pigs. In each case 1% solutions of the anaesthetic were used.

The toxicity, expressed as the $LD_{50}$ in mg./kg. was determined on adult white mice. The toxicity was in every case determined sub-cutaneously (sc.), and in some cases also the intraperitoneal (ip.), and intravenous (iv.) toxicity was also determined.

The tests for irritation of the tissue were carried out upon the ears of rabbits.

The results obtained are expressed as follows:

0 means no effect noticed; (+) means a very slight effect, + means slight, ++ means marked effect and +++ means a very strong effect.

Clinical trials upon the new anaesthetic compounds have been carried out, and it has been shown that in general their properties are fully maintained in clinical use.

Thus, β-piperidyl butyric acid-(o,p-dichloro)-anilide in 2% solution, without the addition of adrenaline, has been used for the anaesthesia of the base of the tongue, the throat, the epiglottis, the glottis, the larynx and the trachea in order to permit bronchoscopy to be carried out.

The anaesthesia of mucous membrane as in bronchoscopy is a delicate matter; any substantial irritation will result in catarrhal secretion with its accompanying dangers, yet at the same time strong anaesthetic effect is required owing to the extreme sensitiveness of the mucous membrane of the throat and bronchial passages. Using a 2% solution, of which some 2 cc. are injected intraglottaly, 2 cc. applied by spray, and between 1 and 2 cc. applied by means of brushing, it was found that in only two cases out of ten was the anaesthesia induced less than satisfactory, and in the majority of cases it was good or even excellent. The anaesthetic effect was fully achieved only after some 5 to 10 minutes, and lasted in most cases between 20 and 40 minutes, usually about 35 minutes. No substantial side-effects have been observed at the dosages thus far employed. 3% solutions have been found to be even more effective in bronchoscopy.

The new anaesthetic compounds according to the present invention have been applied in many fields, and have demonstrated their superior properties as compared with known local anaesthetics. The new compounds are particularly useful in for example dental surgery.

It has been found possible to prepare the new anaesthetic compounds according to the invention by reacting a compound of general formula

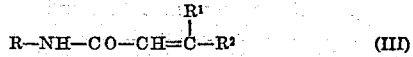

where R, R¹ and R² have the previously stated meanings, with a dialkyl amine containing from two to four carbon atoms or with piperidine or a monoalkyl piperidine.

The reaction takes place with or without pressure at between 90 and 200° C., preferably 100–150° C., if desired in the presence of an organic solvent, and may be represented diagrammatically as follows:

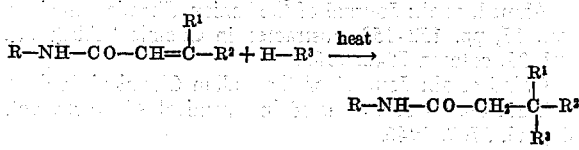

It is not necessary that any additional solvent be present, but there should preferably be a large excess of the secondary amino compound $HR^3$. When the reaction has been completed this excess can be removed by distillation or in any other convenient way.

When the secondary amino compound $HR^3$ has a low boiling point, as in the case of dimethylamine for example, it is convenient to effect the reaction under pressure e. g. in an autoclave. In the case of compounds which have a comparatively high boiling point such as piperidine the reaction can also take place under pressure; it is however also convenient to carry out the reaction at normal pressures, advantageously under reflux.

The further working up of the product of the reaction takes place in any convenient way, and may for example be carried out by dissolving the crude reaction product in an acid, filtering off any undissolved material and precipitating the desired compound with alkali. Further purification can be achieved by repeated recrystallization from a suitable solvent, e. g. from alcohol, or of the hydrochloride or other soluble salt from water.

The present amino compounds can of course be converted into and reconverted from any desired salts thereof in any convenient way.

In order that the invention may be well understood some preferred examples will now be described, by way of illustration only:

EXAMPLE 1

*Preparation of β-diethylamino butyric acid-(p-chloro)-anilide*

15 gm. of crotonic acid (p-chloro)-anilide are reacted with 100 cc. of diethylamine in an autoclave for 15 hours at 150° C. Excess diethylamine is then distilled off, and the residue poured into dilute hydrochloric acid. The solution is separated from any undissolved matter, made alkaline and extracted with ether, and the ethereal solution dried. After the ether has been evaporated off, the residue is taken up in absolute ether, and dry hydrochloric acid gas is passed in. A semi-solid mass of the hydrochloride precipitates, which upon trituration with ethyl acetate becomes solid.

β-Diethylamino butyric acid (p-chloro)-anilide hydrochloride melts at 133–137° C., and is easily soluble in water. The free compound can be obtained by the action of alkalis.

EXAMPLE 2

*Preparation of β-N-piperidyl butyric acid (p-chloro)-anilide*

20 gm. of crotonic acid (p-chloro)-anilide are reacted with 55 ccs. of piperidine at 150° C. in an autoclave for 15 hours. Excess piperidine is distilled off, the residue poured into dilute hydrochloric acid, and the solution separated from any undissolved matter. The clear acid solution is rendered alkaline, whereupon the new compound precipitates.

β-N-piperidyl butyric acid-(p-chloro)-anilide melts at 105–107° C., and is recrystallizable from alcohol. Its hydrochloric, sulphuric, acetic, citric and tartaric acid salts are easily soluble in water.

EXAMPLE 3

*Preparation of β-N-piperidyl butyric acid-(o-chloro)-anilide*

19.5 gm. of crotonic acid-(o-chloro)-anilide are heated with 50 ccs. of piperidine at 150° C. in an autoclave for 15 hours. It is worked up as in Example 2.

β-N-piperidyl butyric acid-(o-chloro)-anilide melts at 84–86° C., is recrystallizable from alcohol, and its salts (hydrochloride, sulphate, etc.) are easily soluble in water.

EXAMPLE 4

*Preparation of β-N-piperidyl butyric acid-(m-chloro)-anilide*

20 gm. of crotonic acid-(m-chloro)-anilide are dissolved in 50 ccs. of piperidine and the reaction mixture is maintained for 15 hours in an autoclave at 150° C. The further working up is as in Example 2.

β-N-piperidyl butyric acid-(m-chloro)-anilide melts at 115–116° C. and is recrystallizable from acetone. The new compound is easily soluble in dilute acids.

EXAMPLE 5

*Preparation of β-N-piperidyl butyric acid-(o,p-dichloro)-anilide*

20 gm. of crotonic acid (2,4-dichloro)-anilide and 50 ccs. of piperidine are maintained for 15 hours in an autoclave at 150° C. The further working up is as in Example 2.

β-Diethylamino butyric acid - (o,p - dichloro) - anilide melts at 70–72° C. The new compound is recrystallizable from petroleum ether, and with acids forms salts which are easily soluble in water.

EXAMPLE 6

*Preparation of β-diethylamino butyric acid (o,p-dichloro)-anilide*

20 gm. of crotonic acid (o,p-dichloro)-anilide and 100 ccs. of diethylamine are maintained for 15 hours in an autoclave at 150° C. The further working up is as for Example 2.

β-diethylamino butyric acid-(o,p-dichloro)-anilide melts at 70–72° C. The new compound is recrystallizable from petroleum ether, and with acids forms salts which are easily soluble in water.

EXAMPLE 7

*Preparation of β-N-piperidyl butyric acid (2,5-dichloro)-anilide*

20 gm. of crotonic acid-(2,5-dichloro)-anilide and 50 ccs. of piperidine are maintained in an autoclave for 15 hours at 150° C. Further working up as for Example 2.

β-N-piperidyl butyric acid-(2,5-dichloro)-anilide melts at 111–112° C. and is recrystallizable from acetone. The new compound forms salts with acids, which are easily soluble in water.

EXAMPLE 8

*Preparation of β-N-piperidyl butyric acid (o,p-dichloro)-anilide*

1 part of crotonic acid (2,4-dichloro)-anilide and 1.7 parts of piperidine are boiled together for 2 hours under reflux at 105–110° C. Excess piperidine is then distilled off and the remainder poured into dilute hydrochloric acid. On cooling the hydrochloride of the new compound precipitates.

The new compound β-N-piperidyl (o,p-dichloro)-anilide melts at 85–87° C.

The preparation of the β-piperidyl derivative of other chlorine substituted anilides of crotonic acid and of higher α,β-unsaturated acids can be carried out in an analogous manner.

We claim:

A new compound selected from the group consisting of β-diethylamino butyric acid-(p-chloro)-anilide, β-diethylamino butyric acid-(o,p-dichloro)-anilide, β-piperidyl butyric acid-(o-chloro)-anilide, β-piperidyl butyric acid-(m-chloro)-anilide, β-piperidyl butyric acid-(p-chloro)- anilide, β-piperidyl butyric acid-(o,p-dichloro)-anilide, and β-piperidyl butyric acid-(2,5-dichloro)-anilide, and non-toxic salts of said compounds.

References Cited in the file of this patent

FOREIGN PATENTS 465,513     Great Britain _____ Aug. 4, 1934

OTHER REFERENCES

Hofstetter: Nature, volume 170, page 980, Dec. 6, 1952.

Hall et al.: Journal of the Chemical Society (London) for 1948, pp. 1909–1911, Jan. 10, 1948.

Ahmed, et al.: Journal of the Indian Chemical Society, vol. 15, pp. 152–159, abstracted in Chemical Abstracts, vol. 32, column 7040, 1938.

Gaind et al.: Journal of the Indian Chemical Society, vol. 23, pp. 9–12, abstracted in Chemical Abstracts, vol. 40, col. 5709, 1946.